United States Patent [19]

Lutz

[11] 3,906,159

[45] Sept. 16, 1975

[54] TDM EXCHANGE WITH INCOMING PCM FRAMES DELAYED WITH RESPECT TO OUTGOING PCM FRAMES

[75] Inventor: Karl-Anton Lutz, Munich, Germany

[73] Assignee: Siemens Aktiengesellschaft, Berlin & Munich, Germany

[22] Filed: Apr. 26, 1973

[21] Appl. No.: 354,841

Related U.S. Application Data

[63] Continuation of Ser. No. 223,557, Feb. 4, 1972, abandoned, which is a continuation of Ser. No. 860,190, Sept. 23, 1969, abandoned.

[52] U.S. Cl. .......................... 179/15 AQ; 179/15 BS

[51] Int. Cl. ............................................. H04j 3/00

[58] Field of Search ......... 179/15 AQ, 15 BS, 15 A; 178/69.5 R

[56] References Cited

UNITED STATES PATENTS 2,910,541 10/1959 Harris .......................... 179/15 AQ

*Primary Examiner*—David L. Stewart

[57] ABSTRACT

A time multiplex communication system for transmission of pulse code modulated signals, using several exchange stations. At each exchange station, varying delays in transmission are compensated for by insertion of delay lines in the transmission paths, to synchronize the pulse frames of the arriving lines with each other. The pulse frames of the departing lines are also synchronized with each other. At each exchange station, the next available time channel is assigned to a signal to be forwarded, as compared with the signal as it arrives at the station. The pulse frames of departing lines are delayed by a set time interval as compared with arriving lines, and the time slots within pulse frames which are assigned to arriving and departing signals are also so set, to require the minimum storage capacity at the exchange stations.

1 Claim, 3 Drawing Figures

TDM EXCHANGE WITH INCOMING PCM FRAMES DELAYED WITH RESPECT TO OUTGOING PCM FRAMES

This is a Continuation of application Ser. No. 223,557, filed Feb. 4, 1972, now abandoned, which is a Continuation application of Ser. No. 860,190, filed Sept. 23, 1969, now abandoned.

GENERAL DESCRIPTION

In the course of the development of long distance communication systems, the use of exchange systems operating according to the time multiplex principle has recently begun. In exchange systems of this type, message signals between connected subscriber stations are transmitted in individual time channels. The message signals can appear in such channels in analog or digital form. Such systems are described with more particularity in U.S. Pat. No. 3,453,594; "Electronics and Communication in Japan,"Vol. 49, No. 11 (1966) especially at pages 118–125; and, "Proceedings of the I.E.E.," Vol. 111, No. 12, (Dec. 1964) pages 1976–1980.

In long distance communication installations operating according to the time multiplex principle wherein the message signals to be transmitted are preferably in digital form, as in the case of PCM (pulse code modulated) message signals, fourwire message signal transmission is often employed. This means that, for the message signal transmission direction in question, an individual time channel is used from among a number of time channels available for that message signal transmission direction. In principle, any time channel can be used for the signal transmission route. However, in the individual exchange stations, this requires considerable storage capacity for storage of the information concerning the time channels used for each connection. Such information is used, among other things, to identify the time channels used for each connection and to make the time channels available, upon the release of a connection, for further connections to be established.

In connection with the transmission of message signals between adjacent exchange stations, there ordinarily occur additional problems, due to the fact that the connection paths between the exchange stations are of different length and that the message signals transmitted over these connection paths arrive at the involved exchange stations with different delays. This means different pulse frame shifts in the entire long distance communication network. In order to eliminate the difficulties resulting therefrom, it is already known (Proceedings of the IEE, Vol. 113, No. 9, Sept. 1966, pp. 1420–1428) that the pulse frames of the departing and arriving connection paths in the individual exchange stations may be synchronized, through the insertion of delay lines into the individual nection paths. In conjunction with a long distance communication system of the just considered type, it is also already known (Proceedings of the IEE, Vol. 111, No. 12, Dec. 1964, pp. 1976–1980) to utilize in the connection path in question, in arriving and departing transmission direction, one and the same time channel within the pulse frame in question, for each connection. Thereby, for the purpose of transition from one time channel used in one connection path to a free time channel available in another connection path for the connection in question, in case a free time channel, having time slots appearing within the pulse frames in question with the same phase position as the time slots of the time channel used in the first mentioned connection path is not found, an intermediate storage means is used. The total storage time of the latter corresponds to the duration of the length of a pulse frame. As different intermediate storage times must be considered, requiring a corresponding number of intermediate stores with a total storage time each corresponding to the duration of a pulse frame and despite the possibility of utilizing these intermediate stores several times, the disadvantages of relatively high equipment requirements results.

It is therefore the task of the invention to show a way to proceed in order to be able to receive and forward message signals freely in time multiplex, in particular in PCM time multiplex exchange stations, without having the disadvantages of the above-considered known processes. To solve this task, the invention proceeds from a process for the reception and forwarding of message signals, in particular in a PCM time multiplex exchange station, of a time multiplex communication network, connected with at least two transmission paths which carry message signals, each in arriving and departing transmission direction. The pulse frames of all lines departing from the exchange stations are synchronized among each other, and the pulse frames of all lines arriving at the exchange stations are synchronized among each other, with the aid of delay lines inserted into these lines. Further, upon the establishment of a connection proceeding over such an exchange station, to which a specific time channel is assigned in the pulse frame of the arriving line in question, in the pulse frame of the line in question, departing in the direction of the establishment of the connection, in each case such a next free time channel is assigned, that the same time channel is used in each case within the pulse frame in question for the transmission of message signals in both transmission directions over a transmission path connected with such an exchange station. This process is characterized, according to the invention, by the fact that the delay lines inserted in the lines arriving at the exchange stations in question are so constructed that the pulse frames of the lines departing from the exchange stations in question possess a time position which is different from that of the pulse frames of the lines arriving at the exchange stations in question, due in each case to a delay time determined according to a desired mean total time interval between the assigned time channels in each case. Due to this measure, the process according to the invention has, in contrast to the above considered known processes, the essential advantage that relatively small storage capacity is required of the intermediate stores to be provided for a time channel conversion in the exchange station in question. I.e., as will be shown later, in the exchange station relatively few intermediate stores are necessary, and each of which need offer only a total storage time corresponding to twice the mentioned, predetermined delay time. If the said predetermined delay time has, for example, a duration corresponding to the duration of two time slots, or time channels, the total storage time in each case is of a duration which corresponds to the duration of four time slots, or time channels.

DETAILED DESCRIPTION

Figure 1:
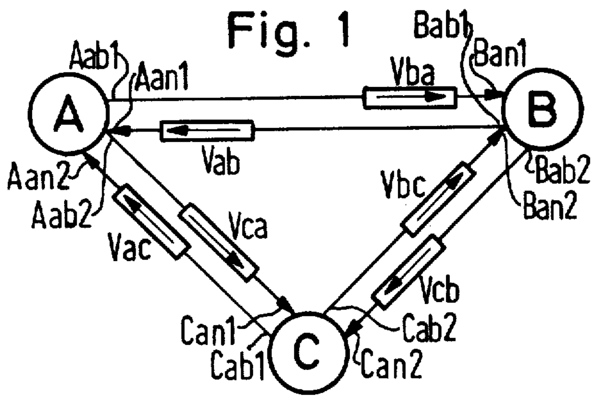
Figure 2A:
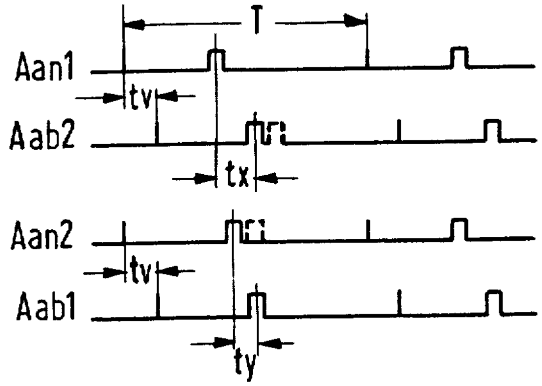
Figure 2B:
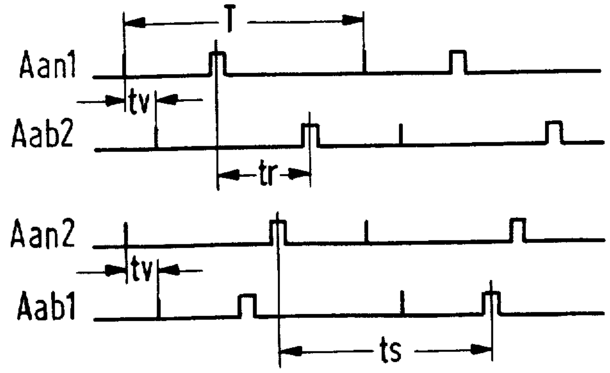

The invention is explained in more detail in the following with the aid of the attached drawings in which:

FIG. 1 shows schematically the development of a long distance communication network; and FIGS. 2a and 2b illustrate the reception and forwarding of message signals in the long distance communication network shown in FIG. 1, in accordance with the invention.

The long distance communication network shown in FIG. 1 is a time multiplex, and in particular a PCM time multiplex long distance communication network. The network includes three exchange stations, i.e. exchange stations A, B and C. These exchange stations A, B, and C are connected with each other in such a way that each exchange station is connected with each of the other exchange stations over a transmission path. Thereby each transmission path comprises in each case at least one arriving and at least one departing line. Delay lines are inserted into the lines arriving at the exchange stations. Thus, delay lines Vab and Vac are inserted into lines *Aan*1 and *Aan*2, arriving at exchange station A. Correspondingly, delay lines *Vba* and *Vbc* are inserted into lines *Ban*1 and *Ban*2, arriving at exchange station B. Quite analogously, delay lines *Vca* and *Vcb* are inserted into lines *Can*1 and *Can*2, arriving at exchange station C. These delay lines serve to synchronize among each other the pulse frames of the lines arriving at each of the individual exahange stations A, B and C. This means that all of the pulse frames of the lines arriving in each of the individual exchange stations have the same beginning and the same length.

In addition to the just mentioned synchronization of the pulse frames of all lines arriving at the individual exchange stations, in the long distance communication network shown in FIG. 1, the pulse frames of all lines departing from the individual exchange stations A, B and C are also synchronized with each other, but this is not shown any further in FIG. 1. As will become evident, the pulse frames of all lines arriving and departing at the individual exchange stations are synchronized with each other in such a way that between the pulse frames of all arriving and all departing lines lies a specific time period *tv*.

Now that the long distance communication network shown in FIG. 1 has been considered, the process according to the invention will be explained in more detail with the aid of the diagrams shown in FIGS. 2a and 2b. According to FIG. 2a, the pulse frames of lines *Aab*1 and *Aab*2, departing from exchange station A, are synchronized with each other. It shall be noted here that, moreover, the pulse frames of all lines departing from the individual exchange stations are similarly synchronized. The pulse frames of lines Aan1 and Aan2, arriving at exchange station A, are, as already mentioned above, also synchronized with the pulse frames of all lines arriving at the remaining exchange stations. Thereby a different time position is given to the pulse frames of lines *Aab*1, *Aab*2, *Bab*1, *Bab*2, *Cab*1 or *Cab*2, departing from the individual exchange stations, due to a specific delay time period *tv*, as compared to the pulse frames of lines *Aan*1, *Aan*2, *Ban*1, *Ban*2, *Can*1 or *Can*2, arriving at the individual exchange stations.

For the introduction of the mentioned delay time *tv*, delay lines *Vab*, *Vba*, *Vac*, *Vca*, *Vbc* or *Vcb* are inserted into the lines arriving at the individual exchange stations. Separate delay lines can be provided for this purpose.

Coming back to FIG. 2a, it will be noted that on line Aan1, arriving at exchange station A, and within pulse frame T, PCM signals appear in a given time slot of a time channel. In this example, the time slot is indicated by an individual impulse time slots appearing in successive pulse frames have the same relative time position in each case. Using the long distance communication network shown in FIG. 1 as a basis, these message signals are received in the assumed case over the said arriving line *Aan*1 from the direction of exchange station B. Further, exchange station A is connected with exchange station B over its departing line Aab1. In the pulse frames of this departing line Aab1 there are now used for the transmission of message signals between the two exchange stations A and B, the same time channels as for the signal transmission in the other transmission direction. This principle may be applied generally to transmissions between other exchange stations. This means, with regard to FIG. 2a that within the pulse frames of departing line *Aab*1 the same time slots are used for the connection to be considered as in the pulse frames of the arriving line *Aan*1. The same is also true, moreover, with regard to the pulse frames on line *Aan*2 arriving at exchange station A, and the pulse frames on line *Aab*2 departing from exchange station A. As already indicated, the message signals appearing in the time channel of line Aan1, arriving at exchange station A, are to be forwarded by exchange station A. In the pulse frame of line *Aab*2, departing in the direction of connection establishment with exchange station C, the next free time channel is to be used for the forwarding of the message signals. This time channel may, in the instant case, be delayed by time period *tx*, as compared to the time channel used in the pulse frame of line *Aan*1, arriving at exchange station A.

The time channels in the pulse frames in question are also correspondingly spaced as compared with one another, upon the reception and forwarding of message signals in the other transmission direction, proceeding over exchange station A. It follows, as is shown in FIG. 2a, that the time channel used in the pulse frame on line *Aab*1, departing from exchange station A, is shifted by the time span *y* as compared with the time channel used in the pulse frame on the arriving line *Aan*2. This means that for the intermediate storage of the message signals to be transmitted over exchange station A a total storage time is required which is equal to the sum of time periods tx and ty. However, this time span, as should be realized, is considerably shorter than the duration of a pulse frame T; as can be shown mathematically it is, in each case, 2 *tv*. Moreover, this relationship between the magnitudes *tx*, *ty* and *tv* becomes especially clear if it is assumed that in the departing line *Aab*2 a time channel is used, which has time slots the following by just 2 *tv*, after the time slots appearing in the pulse frames on the arriving side *Aan*1 of the time channel used on this line. I.e., in this case the message signals, received in the appropriate time channel in the pulse frame on arriving line *Aan*2, need no longer be intermediately stored, in order to be forwarded over line *Aab*1, departing from the exchange station A, in the time channel used in the pulse frames of this departing line. These conditions are illustrated in FIG. 2a by dotted line pulses on lines *Aab*2 and *Aan*2.

It should have been evident from the foregoing that, using the inventive principle of reciprocal spacing of the pulse frames occurring in a connection establishment direction on the receiving and forwarding side of an exchange station by a specific delay time tv, a certain mean total time distance $tx + ty$ is achieved between the time channels used for a message signal transmission. It follows that for the intermediate stores to be provided in the individual exchange stations for the intermediate storage of the message signals in question, only a relatively small storage capacity is required. Thereby, storage pairs serve as intermediate stores, the storages whereof in each case serve to delay message signals by a total of $2tv$.The one store of a pair thereby delays the message signals by a specific value, maximally amounting to $2tv$, and the delay time of the other store of the storage pair in question furnishes a delay time which, when added to the delay time of the said one store, equals $2tv$.

Considered differently, in order to be able to manage in the case of the said intermediate storage of message signals in the individual exchange stations with the just-mentioned relatively low storage capacity, a desired mean total time interval can also be fixed between the time channels to be used. Thus, for example, it can be determined in the case of transmission of PCM-signals, that the total time interval between the assigned time channels should have a total duration of six time channels, or time slot-widths. This means that a PCM signal appearing in a time slot of a time channel is to be further transmitted by the exchange station in question, a time slot of the next-following six time slots. Utilizing pulse frames, each having 32 time slots, for a corresponding number of time channels, it follows that this requirement is possible for about 95 percent of all connection demands. In view of this requirement regarding the desired mean total time interval between the time channels to be used for each message signal, the delay time $tv$ is fixed, between the pulse frames, in the connection establishment direction.

In those cases when it is not possible to place message signals in a free time channel in the pulse frame of the line in question within the desired mean total period, there occurs, as shown in FIG. 2*b*, between the assigned time channels in each case, a total time interval of $tr + ts$. It can be shown mathematically that this time interval is equal to the sum of the duration of a pulse frame T plus twice the delay time period tv between the pulse frames in the direction of connection establishment. Related to the previously considered example, this means that for 5 percent of the message signals conducted over an exchange station, intermediate stores must be made available whose total delay time equals $T + 2tv$. Thereby the entire storage requirements are only slightly increased; however, it is thereby possible that all message signals received by an exchange station can be assigned to a free time channel for forwarding in the direction of connection establishment.

In closing, it should also be noted that, departing from the conditions shown in the drawings and previously explained, instead of further exchange stations in each case, end-connection apparatus can be assigned to the exchange stations, said end apparatus having subscriber stations between which message signals are to be transmitted over the exchange stations in question.

The invention has been described in conjunction with an illustrative embodiment which is susceptible of many modifications within the scope of the invention. Accordingly, the invention is not to be considered limited to this embodiment, but rather only by the scope of the appended claims.

I claim:

1. In apparatus for transmitting data signals in a time multiplex telecommunication system having a plurality of exchange stations, pairs of said exchange stations being connected by at least a pair of transmission lines for bi-directional transmission, said signals being transmitted thereover in time channels in a pulse frame constituted by a plurality of time channels, the data signals in a given time channel in adjacent pulse frames being equally spaced one from the other, wherein the pulse frames departing on transmission lines carring departing transmissions from a said exchange station are synchronized with each other, wherein pulse frames arriving at said exchange station on transmission lines carrying arriving data signals are synchronized with each other by the insertion of delay means in said arriving transmission lines, wherein for the establishment of a connection through said exchange stations, which connection is in a given time channel in a pulse frame on an arriving line, the next free time channel in a pulse frame on the departing line is assigned, said given and said next time channels occupying the same relative positions in the arriving and departing pulse frames, the improvement comprising:

said delay means being constructed to introduce a delay time such that pulse frames in transmission lines departing from a said exchange station are displaced with respect to those on incoming transmission lines by a period of time having a magnitude of $tv$, where $tv = (tx + ty,)/2$ and $tx$ and $ty$ being the time period between the time of arrival of a given time channel at said exchange station and the time of departure of the same time channel in one direction of transmission and the other direction of transmission, respectively, whereby $tv = (tr + ts - T)/2$, where $T$ is the duration of a pulse frame and where $tr$ defines the time interval between the time of appearance of a time slot to be allocated to a connection in one direction of transmission over an outgoing line and the time of appearance of the time slot used over the associated incoming line and where ts defines the time interval between the time of appearance of the time slot to be allocated to the connection in the other direction of transmission over an outgoing line and the time of appearance of the time slot over the associated incoming line.

* * * * *